(12) United States Patent
Mercado (10) Patent No.: US 8,101,918 B1
(45) Date of Patent: Jan. 24, 2012

(54) RE-IMAGING INFRARED LENSES

(75) Inventor: Romeo I. Mercado, Fort Wayne, IN (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 444 days.

(21) Appl. No.: 12/465,132

(22) Filed: May 13, 2009

(51) Int. Cl.
*G01J 1/04* (2006.01)
(52) U.S. Cl. .......................... 250/352; 250/332; 359/357
(58) Field of Classification Search .................. 250/330, 250/332, 333, 352; 359/355–357, 434
See application file for complete search history.

(56) References Cited

U.S. PATENT DOCUMENTS

| | | | | |
|---|---|---|---|---|
| 4,383,173 A * | 5/1983 | Neil et al. | ...................... | 250/330 |
| 4,383,727 A * | 5/1983 | Rogers | ........................... | 359/357 |
| 4,431,917 A * | 2/1984 | Gibbons | ...................... | 250/332 |
| 4,783,593 A * | 11/1988 | Noble | ........................... | 250/352 |
| 5,400,161 A * | 3/1995 | Lambert, Jr. | ..................... | 349/1 |
| 5,833,596 A * | 11/1998 | Bonnell et al. | ................ | 600/109 |
| 5,909,308 A | 6/1999 | Ulrich | | |
| 5,978,132 A | 11/1999 | Ulrich | | |
| 5,994,701 A * | 11/1999 | Tsuchimoto et al. | ......... | 250/351 |
| 6,310,347 B1 * | 10/2001 | Shu et al. | ................. | 250/339.07 |
| 2004/0129889 A1 * | 7/2004 | Barron | ...................... | 250/370.08 |
| 2004/0211907 A1 * | 10/2004 | Wellman et al. | .............. | 250/353 |
| 2005/0243411 A1 * | 11/2005 | Cook | ........................... | 359/363 |
| 2006/0255275 A1 * | 11/2006 | Garman et al. | ............ | 250/338.1 |
| 2007/0195403 A1 * | 8/2007 | Tejada et al. | .................. | 359/357 |

FOREIGN PATENT DOCUMENTS

JP 03041328 A * 2/1991

* cited by examiner

*Primary Examiner* — Mark Consilvio
(74) *Attorney, Agent, or Firm* — RatnerPrestia (57) ABSTRACT

A re-imaging optical system includes a front objective lens group, a relay lens and a Dewar assembly. The front objective lens group includes at least three lenses for focusing light entering an entrance pupil and forming a first image located adjacent or near a field stop. The relay lens group includes at least three lenses for focusing light from the first image toward the Dewar assembly. The Dewar assembly includes a cold stop and a cooled detector array for forming a second image. Advantageously, the second image is a magnified version of the first image. Also advantageously, the distance between the entrance pupil and the detector array is less than or equal to 201 millimeters. Furthermore, the lenses of the front objective lens group and the lenses of the relay lens group are made from readily available material, such as silicon and/or germanium.

24 Claims, 8 Drawing Sheets

RE-IMAGING INFRARED LENSES

STATEMENT REGARDING FEDERALLY SPONSORED RESEARCH

The invention described herein was made in the performance of work under a US Air Force Contract No. 9710 WAAS Night Owl and is subject to the provisions therein.

FIELD OF THE INVENTION

The present invention relates, in general, to an optical system. More specifically, the present invention relates to an optical system incorporating achromatic re-imaging optical lenses for producing an image in the infrared (IR) spectral waveband range of 3 to 5 micrometers.

BACKGROUND OF THE INVENTION

Infrared optical systems are widely used in a variety of applications, such as imaging, defense, homeland security, law enforcement, airborne intelligence, surveillance, reconnaissance, biological and physiological sensing, spaceborne applications, robotics, astronomy, etc. Depending on the application of the optical system, the spectral band pass, packaging, cost and performance may be based on a single lens system, or a complex multi-element optical system. The basic configuration of an infrared optical system may be a telescopic or a focal system, or may be a focal system forming an image of a scene at a detector plane. These IR optical systems may also be configured as non re-imaging or re-imaging, depending on packaging requirements and operational requirements.

The infrared lenses of the system may be spectral band pass limited due to the transmission and absorption properties of the lens materials and its operational environment. With respect to the spectral band pass, infrared optical systems are commonly used in the short wave infrared range (SWIR, 0.7 to 3.0 microns band), the mid wave infrared range (MWIR, 3.0 to 5.0 microns band), and the long wave infrared range (LWIR, 6 to 12 microns band). Refractive optical materials may be selected for the optical lenses depending on the amount of transmission desired in the band of operation.

An image produced by an optical system has imperfections, called aberrations. These aberrations may take many forms. For example, chromatic or color aberration is a consequence of dispersion. Shorter wavelengths are bent the most and, consequently, focus nearest to the lens; while the longer wavelengths are bent the least and, consequently, focus farther from the lens. Spherical aberration results when spherical lens surfaces are used. Light striking nearer to the periphery of the spherical lens focuses closer to the lens, while light striking near the center of the lens focuses farther away from the lens.

In addition, an optical system is generally affected by changes in temperature. The effective focal length and the back focal distance of an optical system, depending on the materials of the lenses, may increase or decrease as temperature rises. As temperature varies, the image plane of the sensor moves because of changes in the index of refraction and the radii of the lenses.

Conventionally, athermalization and achromatization of optical systems were generally corrected by mechanical devices, usually resulting in compromised image quality. In U.S. Pat. Nos. 5,978,132, issued on Nov. 2, 1999 and 5,909,308, issued on Jun. 1, 1999, to the same inventor Wilhem Ulrich, optical systems are disclosed that correct both, chromaticity and focal shift over thermal variations. Both of these patents are incorporated herein by reference.

More specifically, the patents disclosed by Ulrich provide re-imaging optical systems that are achromatic in the 7.5-10.5 microns band pass range. Each re-imaging optical system includes an athermalized lens system having a front objective, an intermediate image plane, and a relay optic limited to the infrared range of about 10 microns.

In addition, these re-imaging systems utilize two types of lens materials for achromatization and athermalization in the 7.5-10.5 microns wave band. The lens materials include ZnSe or ZnS negative lenses and positive lenses made of special chalcogenide glass IG6 or IG4 type, from Vitron Spezialwerkstoff of Jena, Germany. These lenses are expensive and not readily available.

As will be explained, the present invention includes a re-imaging system that is both achromatic and athermalized, uses lenses made from readily available materials, has a focal length much greater than the short focal length disclosed by Ulrich, and operates in the 3 to 5 micrometer waveband range.

SUMMARY OF THE INVENTION

To meet this and other needs, and in view of its purposes, the present invention provides a lens system including a front objective lens group having at least three lenses for focusing light entering an entrance pupil and forming a first image located adjacent or near a field stop. The system also includes a relay lens group having at least three lenses for focusing light from the first image toward a Dewar assembly. The Dewar assembly includes a cold stop and a cooled detector array for forming a second image, which is a magnified image of the first image. The distance between the entrance pupil and the detector array is less than or equal to 201 millimeters.

The front objective lens group, the relay lens group and the Dewar assembly are sequentially positioned to receive the light on a common longitudinal axis. The front objective lens group includes at least one lens located proximate to the field stop, and at least one lens having two positive radial surfaces.

The relay lens group includes at least three lenses having a total of at least four negative radial surfaces. The relay lens group also includes at least one aspheric lens.

The field stop and the detector array are configured, respectively, to form the first image and the second image in the infrared spectral waveband range of 3 to 5 micrometers.

Another aspect of the present invention is a re-imaging optical system for the mid-wave infrared range (MWIR). The system includes a front objective lens group consisting of four first lenses disposed between an entrance pupil and a field stop, the four first lenses including at least two first lenses disposed proximate to each other and at least one first lens disposed distal from the at least two first lenses. Also included is a relay lens group consisting of three second lenses disposed between the field stop and a Dewar assembly, the three second lenses including a total of at least four negative radial surfaces. The Dewar assembly including, in sequence, a window, a spectral filter, a cold stop and a cooled detector array. The front objective lens group forms a first image adjacent or near the field stop, and the Dewar assembly together with the relay lens group form a second image at the detector array. The first and second images are formed in the MWIR wave band of 3-5 microns. The distance between the entrance pupil and the detector array is less than or equal to 201 millimeters. The first and second lenses are formed from a material that does not include chalcogenide glass.

Yet another aspect of the present invention is a re-imaging optical system that includes a front objective lens group consisting of four first lenses, disposed between an entrance pupil and a field stop, in the following sequence of (a) through (d):
(a) a spherical lens having two positive radial surfaces,
(b) a spherical lens having two positive radial surfaces,
(c) a spherical lens having two positive radial surfaces, and
(d) a spherical lens having two positive radial surfaces.

Also included is a relay lens group consisting of three second lenses disposed between the field stop and a Dewar assembly, in the following sequence of (e) through (g):
(e) a lens having an aspherical negative radial surface and a spherical negative radial surface,
(f) a lens having a flat surface and a spherical negative radial surface, and
(g) a lens having a spherical negative radial surface and an aspherical negative radial surface.

A first image is formed adjacent or near the field stop, and a second image is formed by the Dewar assembly and the relay lens group.

The second image is a magnified version of the first image. The distance between the entrance pupil and the second image is less than or equal to 201 millimeters.

In still another aspect of the present invention the distance between a surface of a lens of the front objective lens group, which is positioned closest to the entrance pupil, and the detector array is less than or equal to 150 millimeters. In addition the ratio between a focal length of the objective lens group and a focal length of the relay lens group is approximately equal to 5, and is effective in providing a magnification between the first image and the second image.

It is understood that the foregoing general description and the following detailed description are exemplary, but are not restrictive, of the invention.

BRIEF DESCRIPTION OF THE FIGURES

The invention may be understood from the following detail description when read in connection with the accompanying figures.

DETAILED DESCRIPTION OF THE INVENTION

The present invention includes an achromatic re-imaging optical system suitable for detecting an object scene. The optical system is capable of imaging an object field over the spectral waveband range of 3-5 micrometers. The re-imaging optical system includes a front objective lens group for focusing light from the object scene to a first or intermediate image plane, and a relay lens group for refocusing the first image to the second or final image plane. The objective lens group and relay lens group are arranged to define a common optical axis. Advantageously, the objective lens group and the relay lens group include lenses selected from readily available is infrared transmitting materials, such as silicon, germanium, zinc selenide and zinc sulfide.

As will be explained, the present invention includes embodiments that may be scaled to different focal lengths and applied to re-imaging optical systems in the 3-5 micron wavelength band. These embodiments may also provide athermal solutions when the lenses are mounted in a thermally invariant housing. The present invention may also be applied to other infrared spectral bands, such as the LWIR band, when the lens materials are replaced with lens materials suitable for the LWIR band and the lens design parameters are adjusted to meet the optical performance.

Advantageously, the present invention offers several benefits over non re-imaging systems, namely, an accessible real entrance pupil for conveniently positioning a beam steering mirror; an accessible real exit pupil that may be coincident and collocated with a cold stop, next to an image detector; an optimal cold shield confined to a small space; and an accessible real intermediate image which enables locating a field stop with good off-axis radiation rejection. A re-imaging system of the present invention has an additional advantage of being relatively compact and yet capable of achieving a long focal length and a large field of view. The present invention has diffraction-limited performance in the 3-5 microns spectral wave band.

It will be appreciated that an obstacle in the spectral band of 3-5 microns of a re-imaging system is the chromatic variations of aberrations, which may be aperture-dependent and/or field-dependent. Aperture-dependent aberrations include spherical aberration, spherochromatism, and axial chromatic aberrations. Field-dependent aberrations include coma, astigmatism, Petzval or field curvature, distortion, and lateral color. The present invention, however, provides corrections for chromatic variations of aberrations that are both aperture-dependent and field-dependent. The present invention also provides optical parameters that may be scaled over a wide range of focal lengths, apertures and field diameters, while preserving diffraction-limited performance over the 3-5 micron wavelength band.

Figure 1:
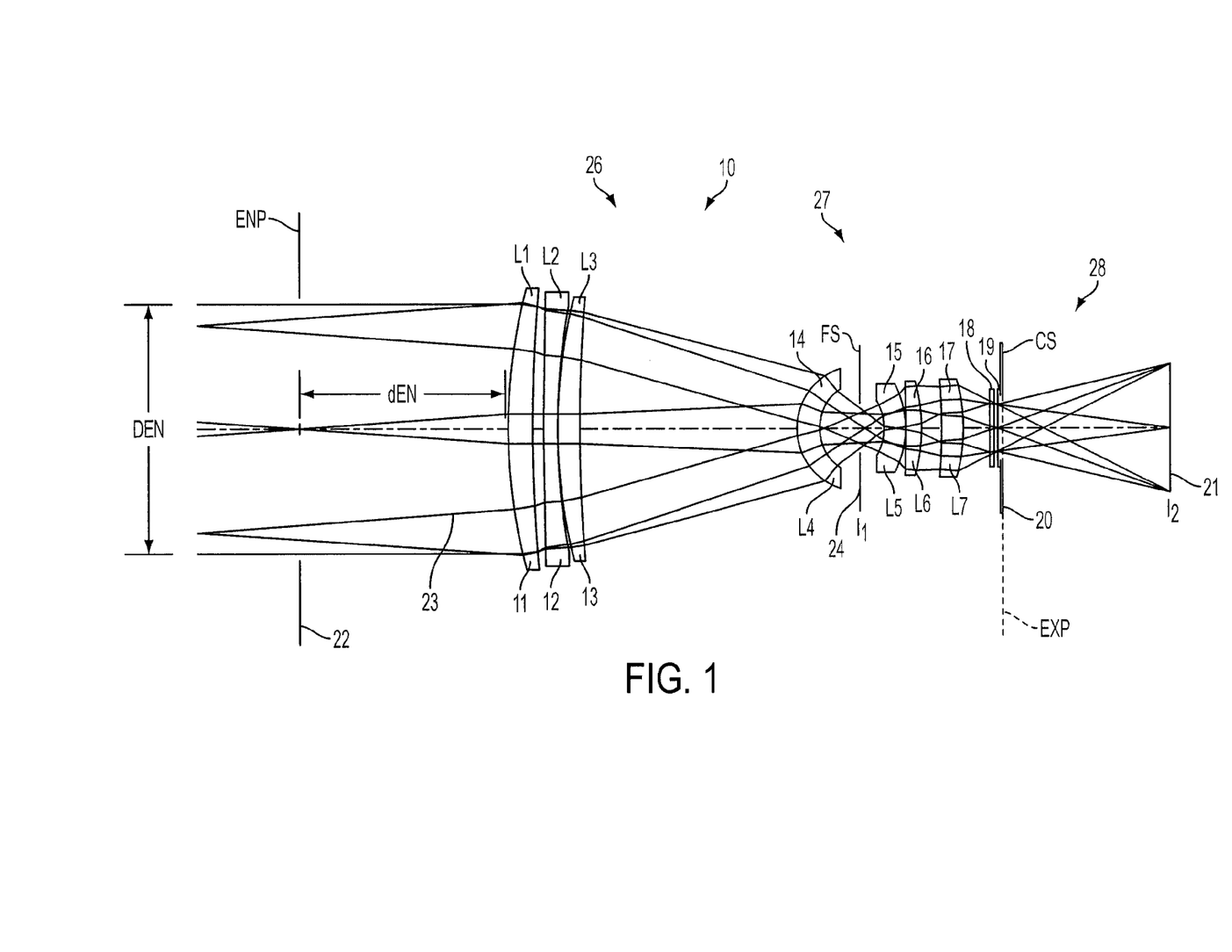
FIG. 1 is a cross sectional view of a first embodiment of a re-imager optical system of the invention, where the re-imager system includes seven lenses.

Turning first to FIG. 1, there is shown a cross-sectional view of a re-imaging infrared optical system, generally designated as 10. As shown, re-imaging infrared system 10 includes a front objective lens group 26 for focusing light rays 23 from an object scene (not shown), through a real entrance pupil (ENP) 22, toward a first image ($I_1$) located adjacent, or near field stop (FS) 24. The infrared system 10 also includes a relay lens group 27 and a Dewar assembly 28. The front objective lens group 26 includes lens elements L1, L2, L3 and L4, respectively designated as 11, 12, 13 and 14. The relay lens group 27 includes lens elements L5, L6, and L7, respectively designated as 15, 16 and 17. The Dewar assembly 28 includes a plane parallel window, designated as 18; a spectral filter, designated as 19; a cold stop (CS), designated as 20; and a cooled detector array, which produces a final image plane ($I_2$), designated as 21.

The re-imaging system 10 includes real entrance pupil 22 with a pupil diameter size of $D_{EN}$, located in front of the lens system at a distance $d_{EN}$ from the front surface of lens $L_1$; also included is a real exit pupil, EXP, with a pupil diameter $D_{EX}$, located at a distance $d_{EX}$ from the spectral filter. The exit pupil is collocated and coincident with cold stop 20, which is also the aperture stop of imaging system 10, and provides 100% cold shielding efficiency. The field stop 24 is located at or near the intermediate image, or first image plane $I_1$ for better off-axis radiation rejection.

The optical prescriptions for the lenses and elements of re-imaging infrared optical system 10 shown in FIG. 1 are provided in Table 1. The optical system 10 provides a nominal 200-mm focal length at 4.0 microns, an F/4 focal ratio and 7.5 degrees of field-of-view (FOV). In addition, the distance between entrance pupil (ENP) 22 and detector array 21 is a nominal distance about 201-mm at 4.0 microns.

It will be appreciated that the focal length of the objective lens group (L1, L2, L3 and L4), based on Table 1 parameters, at 4.0 microns, is 47.1 mm. The focal length of the relay lens group (L5, L6 and L7), based on Table 1 parameters, at 4.0 microns, is 8.7 mm. Dividing the focal length of the objective lens group by the focal length of the relay lens group, a ratio of 5.41 is obtained. This ratio is essentially the ratio of the entrance pupil diameter to the exit pupil diameter. Consequently, the present invention provides a magnification between the first image, $I_1$, and the second image, $I_2$. This magnification may be seen by examining FIG. 1. The paraxial image diameter of the first image, $I_1$, is about 6.2 mm, and the paraxial image diameter of the second image, $I_2$, is about 26.4 mm. Thus, the first image is magnified by about 4.2 times. (It will be appreciated that Tables 2 and 7, described below, have similar ratios.)

Figure 8:
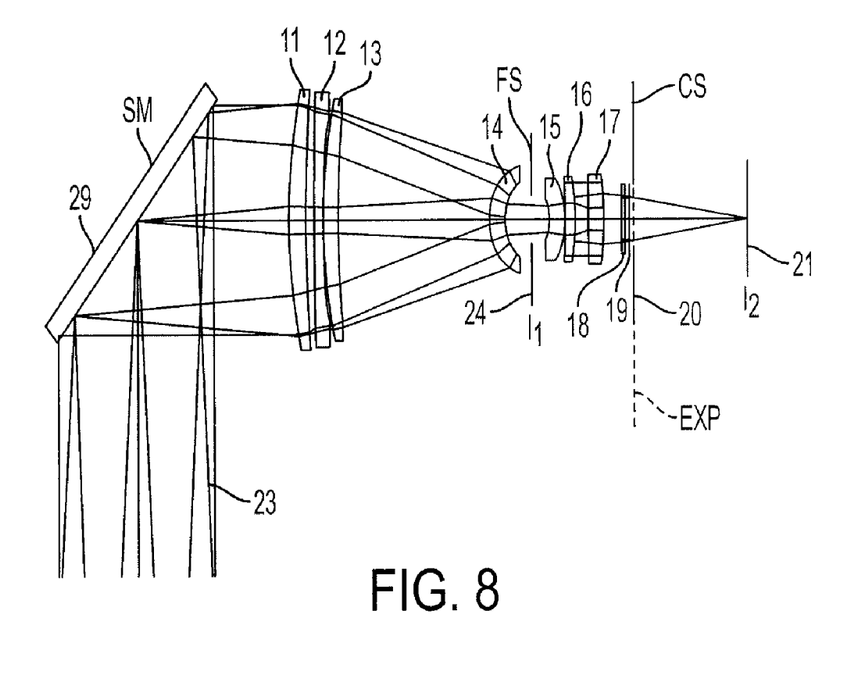
FIG. 8 is a cross sectional view of a re-imager optical system including a scanning mirror positioned in front of an objective lens group, in accordance with another embodiment of the present invention.

The lens system 10 provides an accessible real entrance pupil at a distance in front of the first lens element L1 which is suitable for positioning of a scanning or beam steering mirror 29, as schematically illustrated in FIG. 8. The exemplary embodiment shown in FIG. 1 is suitable for a scanning or a non scanning application.

In the optical prescriptions listed in Table 1, a positive radius indicates a center of curvature to the right of the surface, and a negative radius indicates a center of curvature to the left of the surface. The thickness is the axial distance to the next surface and all dimensions are in millimeters. Furthermore, "S#" stands for surface number, "T or S" stands for "thickness or separation". Also, "INF" stands for "infinity", "CC" stands for "concave" and "CX" stands for "convex". Moreover, under the heading "surface shape" an aspheric is denoted by "ASP", a flat by "FLT", and a spherical surface by "SPH". Under the heading "material" the glass names or material designations are listed.

It will be understood that each lens element includes two surfaces; and surface 11 of lens element L5 and surface 16 of lens element L7 are aspheric surfaces

TABLE 1

OPTICAL PRESCRIPTIONS FOR LENS SYSTEM SHOWN IN FIG. 1
200-mm EFL, F/4, 7.5 degrees FOV

| SURFACE DESCRIPTION | | | | | |
|---|---|---|---|---|---|
| S# | Radius | Shape | T or S | Material | Element Description |
| 0 | INF | FLT | INFINITY | | Object |
| 1 | INF | FLT | 50.000 ($d_{EN}$) | | Entrance Pupil |
| 2 | 99.183 CX | SPH | 5.7500 | SILICON | L1 |
| 3 | 271.406 CC | SPH | 2.5574 | | |
| 4 | 997.090 CX | SPH | 3.0000 | GERMANIUM | L2 |
| 5 | 129.695 CC | SPH | 0.1000 | | |
| 6 | 99.818 CX | SPH | 5.0000 | SILICON | L3 |
| 7 | 256.214 CC | SPH | 49.7225 | | |
| 8 | 12.316 CX | SPH | 5.0000 | GERMANIUM | L4 |
| 9 | 9.194 CC | SPH | 7.3593 | | |
| 10 | INF | FLT | 7.1754 | | Intermediate Image ($I_1$) |
| 11 | −12.675 | A-1* | 5.0000 | GERMANIUM | L5 |
| 12 | −18.195 CX | SPH | 0.1000 | | |
| 13 | INF | FLT | 3.5000 | SILICON | L6 |
| 14 | −34.114 CX | SPH | 4.5342 | | |
| 15 | −127.826 CC | SPH | 5.0000 | SILICON | L7 |
| 16 | −35.702 | A-2** | 5.9930 | | |
| 17 | INF | FLT | 1.016 | SILICON | Dewar Window |
| 18 | INF | FLT | 0.5842 | | |
| 19 | INF | FLT | 0.5080 | SILICON | Spectral Filter |
| 20 | INF | FLT | 0.0000 | | |
| 21 | INF | FLT | 38.0452 | | Aperture Stop/Cold Stop |
| 22 | INF | FLT | | | Image Plane ($I_2$) |

| ASPHERIC CONSTANTS | | | | | | |
|---|---|---|---|---|---|---|
| ASPHERIC | CURV | K | A | B | C | D |
| *A-1 | −0.07889272 | 2.248299 | 0.00000E+00 | 3.42920E−07 | 0.00E+00 | 0.00E+0 |
| **A-2 | −0.02800948 | −3.119964 | 0.00000E+00 | 3.19276E−08 | 0.000E+00 | 0.00E+0 |

The aspheric equation describing an aspherical surface may be as follows:

$$z = \frac{(CURV)Y^2}{1+(1-(1+K)(CURV)^2Y^2)^{\frac{1}{2}}} + (A)Y^4 + (B)Y^6 + (C)Y^8 + (D)Y^{10}$$

wherein "CURV" is the spherical curvature of the surface (the reciprocal of the radius of curvature of the surface), K is the conic constant, and A, B, C, and D are the aspheric coefficients. In table 1, "E" denotes exponential notation (powers of 10).

Figure 2:
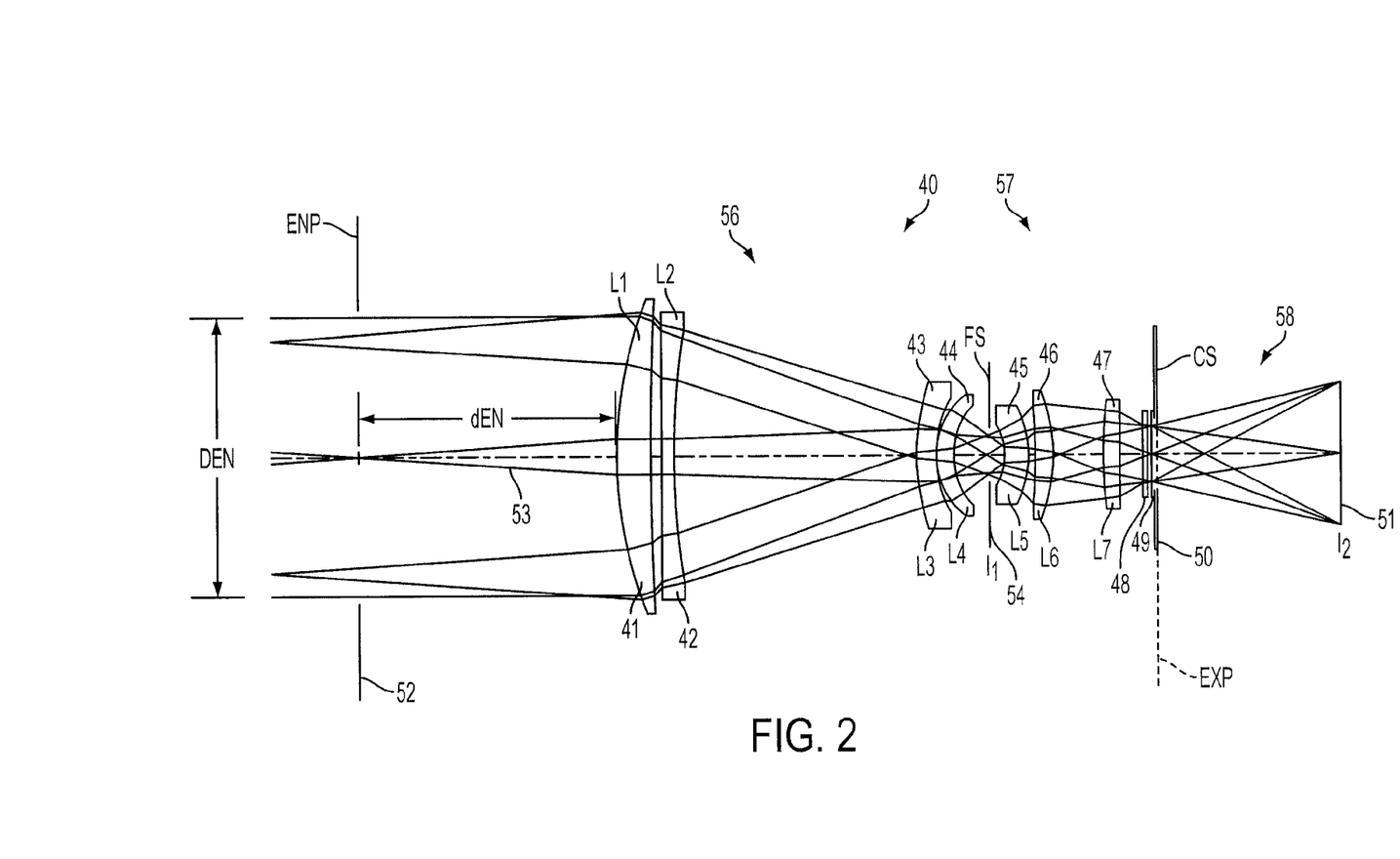
FIG. 2 is a cross sectional view of a second embodiment of a re-imager optical system of the invention, where the re-imager system also includes seven lenses.

Turning next to FIG. 2, there is shown a cross-sectional view of a re-imaging infrared optical system, generally designed as 40. As shown, re-imaging infrared system 40 includes a front objective lens group 56 for focusing light rays 53 from an object scene (not shown), through a real entrance pupil (ENP) 52, toward a first image ($I_1$) located adjacent, or near field stop (FS) 54. The infrared system 40 also includes a relay lens group 57 and a Dewar assembly 58. The front objective lens group 56 includes lens elements L1, L2, L3 and L4, respectively designated as 41, 42, 43 and 44. The relay lens group 57 includes lens elements L5, L6 and L7, respectively designated as 45, 46 and 47. The Dewar assembly 58 includes a plane parallel window, designated as 48; a spectral filter, designated as 49; a cold stop (CS), designated as 50; and a cooled detector array, which produces a final image plane ($I_2$), designated as 51.

The re-imaging system 40 includes real entrance pupil 52 with a pupil diameter size of $D_{EN}$, located in front of the lens system at a distance $d_{EN}$ from the front surface of $L_1$; also included is a real exit pupil, EXP, with pupil diameter $D_{EX}$, located at a distance $d_{Ex}$ from the spectral filter. The exit pupil is collocated and coincident with cold stop 50, which is also the aperture stop of imaging system 10, and provides 100% cold shielding efficiency. The field stop 54 is located at or near the intermediate image, or first image plane $I_1$ for better off-axis radiation rejection.

The optical prescriptions for the lenses and elements of the re-imaging infrared optical system shown in FIG. 2 are listed in Table 2. The lens system 40 provides a nominal 200-mm focal length at 4.0 microns, an F/4 focal ratio and 7.5 degrees of field-of-view.

The lens system 40 includes an accessible real entrance pupil at a distance in front of the first lens element L1 that is suitable for positioning of a scanning or beam steering mirror 29, as schematically illustrated in FIG. 8. The exemplary embodiment shown in FIG. 2 is suitable for use as a scanning or a non scanning re-imaging system.

It will be noted in Table 2 that surface 11 of lens element L5, surface 14 of lens element L6, and surface 16 of lens element L7 are aspheric surfaces.

TABLE 2

OPTICAL PRESCRIPTIONS FOR LENS SYSTEM SHOWN IN FIG. 2
200-mm EFL, F/4, 7.5 degrees FOV

| | SURFACE DESCRIPTION | | | | |
|---|---|---|---|---|---|
| S# | Radius | Shape | T or S | Material | Element Description |
| 0 | INF | FLT | INFINITY | | Object |
| 1 | INF | FLT | 50.000 ($d_{EN}$) | | Entrance Pupil |
| 2 | 67.479 CX | SPH | 7.0000 | SILICON | L1 |
| 3 | 328.409 CC | SPH | 2.2236 | | |
| 4 | 652.783 CX | SPH | 2.5000 | GERMANIUM | L2 |
| 5 | 123.564 CC | SPH | 49.8028 | | |
| 6 | 35.183 CX | SPH | 4.0000 | ZINC SELENIDE | L3 |
| 7 | 19.625 CC | SPH | 0.1000 | | |
| 8 | 12.130 CX | SPH | 3.5000 | GERMANIUM | L4 |
| 9 | 12.220 CC | SPH | 3.9068 | | |
| 10 | INF | FLT | 6.2715 | | Intermediate Image ($I_1$) |
| 11 | −10.941 | A-1* | 5.0000 | GERMANIUM | L5 |
| 12 | −19.761 CX | SPH | 1.3203 | | |
| 13 | −182.482 CC | SPH | 4.0000 | SILICON | L6 |
| 14 | −23.308 | A-2** | 10.1830 | | |
| 15 | 66.788 CX | SPH | 3.5000 | SILICON | L7 |
| 16 | −238.774 | A-3*** | 4.4443 | | |
| 17 | INF | FLT | 1.0160 | SILICON | Dewar Window |
| 18 | INF | FLT | 0.5842 | | |
| 19 | INF | FLT | 0.5080 | SILICON | Spectral Filter |
| 20 | INF | FLT | | | |
| 21 | INF | FLT | 37.9930 | | Aperture Stop/Cold Stop |
| 22 | INF | FLT | | | Image Plane ($I_2$) |

| ASPHERIC CONSTANTS | | | | | | |
|---|---|---|---|---|---|---|
| ASPHERIC | CURV | K | A | B | C | D |
| *A-1 | −0.09139532 | 1.594563 | 0.00E+00 | 2.98687E-07 | 1.34432E-08 | 0.00E+0 |
| **A-2 | −0.04290422 | −0.993720 | 0.00E+00 | 5.36581E-09 | 2.93484E-11 | 0.00E+0 |
| ***A-3 | −0.00418805 | 0.000 | 7.06073E-06 | 6.98603E-08 | −3.00067E-10 | 0E+0 |

The aspheric equations for the aspheric surfaces have been provided previously with respect to Table 1. The acronyms shown in Table 2 have been described previously with respect to Table 1.

Figure 3:
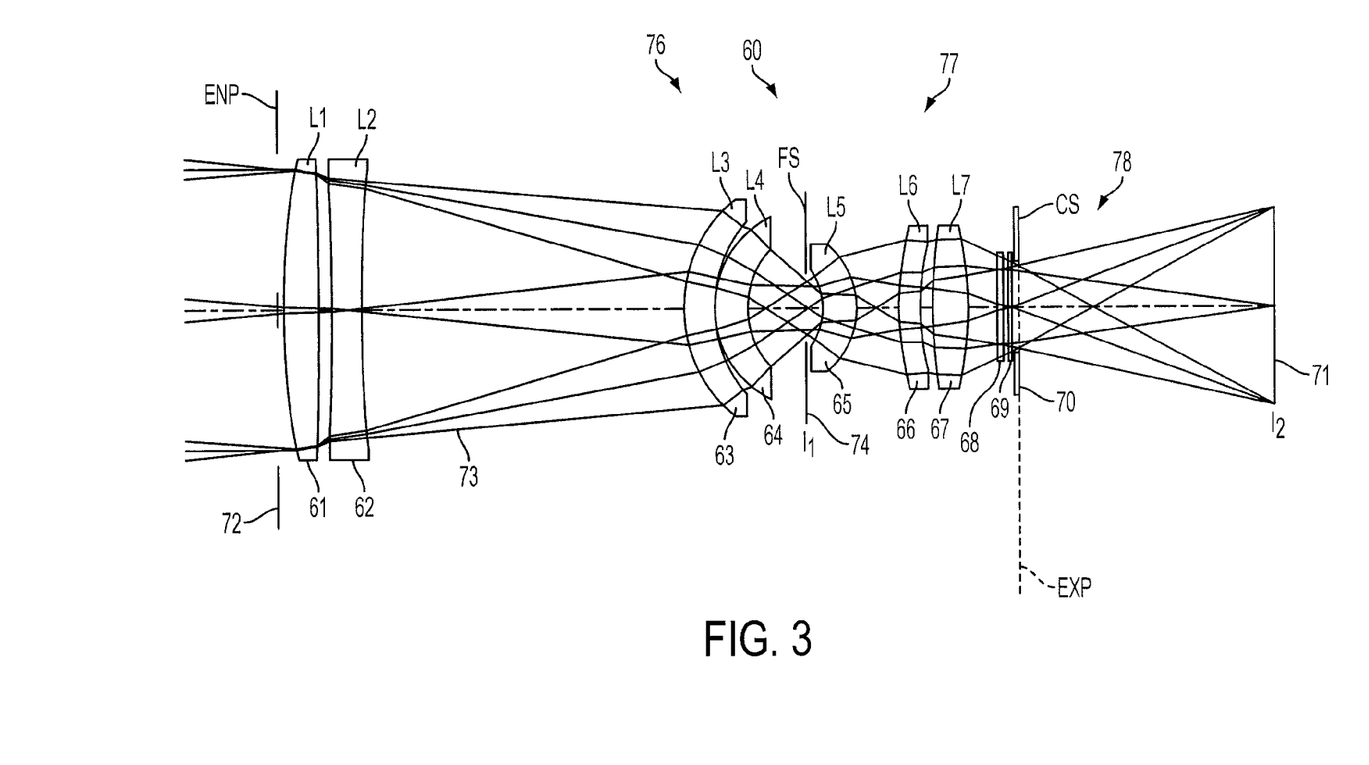
FIG. 3 is a cross sectional view of a third embodiment of a re-imager optical system of the invention, where the re-imager system also includes seven lenses.

Another embodiment of the present invention is shown in FIG. 3 as re-imaging infrared optical system 60. As shown, re-imaging infrared system 60 includes a front objective lens group 76 for focusing light rays 73, through a real entrance pupil (ENP) 72, toward a first image ($I_1$) located at field stop (FS) 74. The infrared system 60 also includes a relay lens group 77 and a Dewar assembly 78. The front objective lens group 76 includes lens elements L1, L2, L3 and L4, respectively designated as 61, 62, 63 and 64. The relay lens group 77 includes lens elements L5, L6, and L7, respectively designated as 65, 66 and 67. The Dewar assembly 78 includes a plane parallel window, designated as 68; a spectral filter, designated as 69; a cold stop (CS), designated as 70; and a cooled detector array, which produces a final image plane ($I_2$), designated as 71.

The optical prescriptions for the lenses and elements of the re-imaging infrared system shown in FIG. 3 are listed in Table 3. The lens system 60 provides a nominal 150-mm focal length at 4.0 microns, an F/4 focal ratio and 10.0 degrees of field-of-view.

Figure 4:
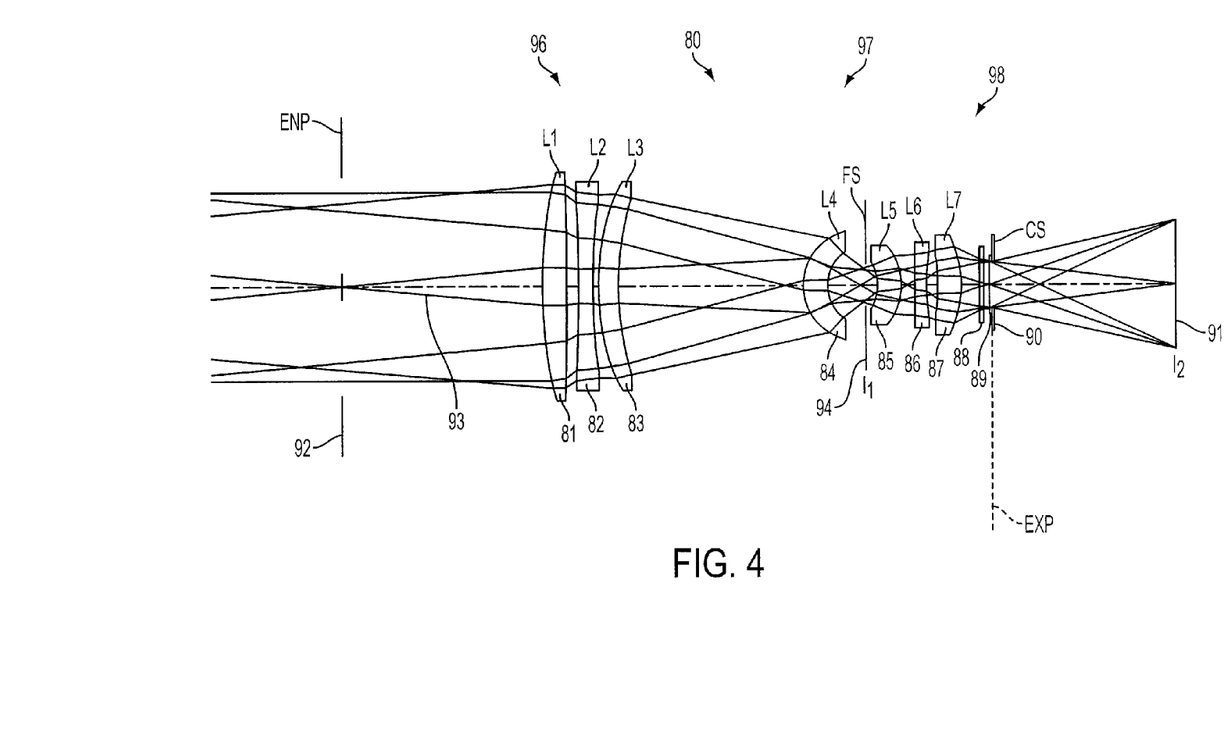
FIG. 4 is a cross sectional view of a fourth embodiment of a re-imager optical system of the invention, where the re-imager system also includes seven lenses.

The optical system 60 provides an example of a re-imaging lens system having an entrance pupil 72, located at the first surface of the first lens element L1 ($d_{EN}$=0), designated as 61. This embodiment provides an example of a re-imaging lens system with features suitable for a non scanning system, unlike optical systems 10 or 40, for example.

objective lens group 96 includes lens elements L1, L2, L3 and L4, respectively designated as 81, 82, 83 and 84. The relay lens group 97 includes lens elements L5, L6 and L7, respectively designated as 85, 86 and 87. The Dewar assembly 98 includes a plane parallel window, designated as 88; a spectral filter, designated as 89; a cold stop (CS), designated as 90; and a cooled detector array, which produces a final image plane ($I_2$), designated as 91.

TABLE 3

OPTICAL PRESCRIPTIONS FOR LENS SYSTEM SHOWN IN FIG. 3
150-mm EFL, F/4, 10 degrees FOV

| | SURFACE DESCRIPTION | | | | |
|---|---|---|---|---|---|
| S# | Radius | Shape | T or S | Material | Element Description |
| 0 | INF | FLT | INFINITY | | Object |
| 1 | 92.852 CX | SPH | 5.0743 | SILICON | L1 |
| 2 | −938.745 CX | SPH | 1.7059 | | |
| 3 | −396.901 CC | SPH | 4.396 | GERMANIUM | L2 |
| 4 | 215.001 CC | SPH | 47.1768 | | |
| 5 | 17.836 CX | SPH | 4.509 | SILICON | L3 |
| 6 | 16.727 CC | SPH | 0.1000 | | |
| 7 | 13.306 CX | SPH | 4.6700 | SILICON | L4 |
| 8 | 10.856 CC | SPH | 6.3575 | | |
| 9 | INF | FLT | 4.6066 | | Intermediate Image ($I_1$) |
| 10 | −9.055 | A-1* | 5.0000 | SILICON | L5 |
| 11 | −10.351 CX | SPH | 6.1729 | | |
| 12 | 42.894 CX | SPH | 3.0000 | GERMANIUM | L6 |
| 13 | 35.756 CC | SPH | 1.9614 | | |
| 14 | 70.536 CX | SPH | 5.0000 | SILICON | L7 |
| 15 | −45.718 | A-2** | 4.2724 | | |
| 16 | INF | FLT | 1.0160 | SILICON | Dewar Window |
| 17 | INF | FLT | 0.5842 | | |
| 18 | INF | FLT | 0.5080 | SILICON | Spectral Filter |
| 19 | INF | FLT | 0.0000 | | |
| 20 | INF | FLT | 38.1000 | | Aperture Stop/Cold Stop |
| 21 | INF | FLT | | | Image Plane ($I_2$) |

| ASPHERIC CONSTANTS | | | | | | |
|---|---|---|---|---|---|---|
| ASPHERIC | CURV | K | A | B | C | D |
| *A-1 | −0.11044141 | 0.00 | −2.78343E−04 | −1.57761E−06 | −1.04999E−07 | 0.000E+0 |
| **A-2 | −0.02187306 | 0.00 | 3.38446E−06 | 6.97687E−08 | −7.68269E−10 | 3.24980E−12 |

Yet another embodiment of the present invention is shown in FIG. 4 as re-imaging infrared system 80. As shown, re-imaging infrared system 80 includes a front objective lens group 96 for focusing light rays 93, through a real entrance pupil (ENP) 92, toward a first image ($I_1$) located adjacent, or near field stop (FS) 94. The infrared system 80 also includes a relay lens group 97 and a Dewar assembly 98. The front The optical prescriptions for the lenses and elements of the re-imaging infrared optical system shown in FIG. 4 are listed in Table 4. The lens system 80 provides a nominal 150-mm focal length at 4.0 microns, an F/4 focal ratio and 10.0 degrees of field-of-view. The re-imaging system 80 includes an accessible real entrance pupil 92 and may accommodate a scanning mirror, as shown in FIG. 8, if required by the application.

TABLE 4

OPTICAL PRESCRIPTIONS FOR LENS SYSTEM SHOWN IN FIG. 4
150-mm EFL, F/4, 10-deg FOV

| | SURFACE DESCRIPTION | | | | |
|---|---|---|---|---|---|
| S# | Radius | Shape | T or S | Material | Element Description |
| 0 | INF | FLT | INFINITY | | Object |
| 1 | INF | FLT | 50.000 ($d_{EN}$) | | Entrance Pupil |
| 2 | 92.852 CX | SPH | 5.0743 | SILICON | L1 |
| 3 | −938.745 CX | SPH | 2.5170 | | |
| 4 | −350.788 CC | SPH | 3.0000 | GERMANIUM | L2 |
| 5 | 149.174 CC | SPH | 1.1874 | | |
| 6 | 49.897 CX | SPH | 4.0000 | SILICON | L3 |
| 7 | 61.903 CC | SPH | 38.4159 | | |
| 8 | 11.335 CX | SPH | 5.0000 | GERMANIUM | L4 |

TABLE 4-continued

OPTICAL PRESCRIPTIONS FOR LENS SYSTEM SHOWN IN FIG. 4
150-mm EFL, F/4, 10-deg FOV

| | | | | | |
|---|---|---|---|---|---|
| 9 | 8.471 CC | SPH | 4.7590 | | |
| 10 | INF | FLT | 5.3983 | | Intermediate Image($I_1$) |
| 11 | −13.348 | *A-1 | 5.0000 | GERMANIUM | L5 |
| 12 | −12.747 CX | SPH | 2.9637 | | |
| 13 | INF | FLT | 2.5000 | GERMANIUM | L6 |
| 14 | 60.221 CC | SPH | 1.9961 | | |
| 15 | −279.094 CC | SPH | 5.0000 | SILICON | L7 |
| 16 | −22.356 CX | SPH | 3.8279 | | |
| 17 | INF | FLT | 1.0160 | SILICON | Dewar Window |
| 18 | INF | FLT | 0.5842 | | |
| 19 | INF | FLT | 0.5080 | SILICON | Spectral Filter |
| 20 | INF | FLT | 0.0000 | | |
| 21 | INF | FLT | 38.1000 | | Aperture Stop/Cold stop |
| 22 | INF | FLT | | | Image Plane ($I_2$) |

ASPHERIC CONSTANTS

| ASPHERIC | CURV | K | A | B | C | D |
|---|---|---|---|---|---|---|
| *A-1 | −0.07491946 | 0.00 | −2.71491E-04 | −5.03053E-07 | −1.00333E-07 | 0.00E+0 |

Figure 5:
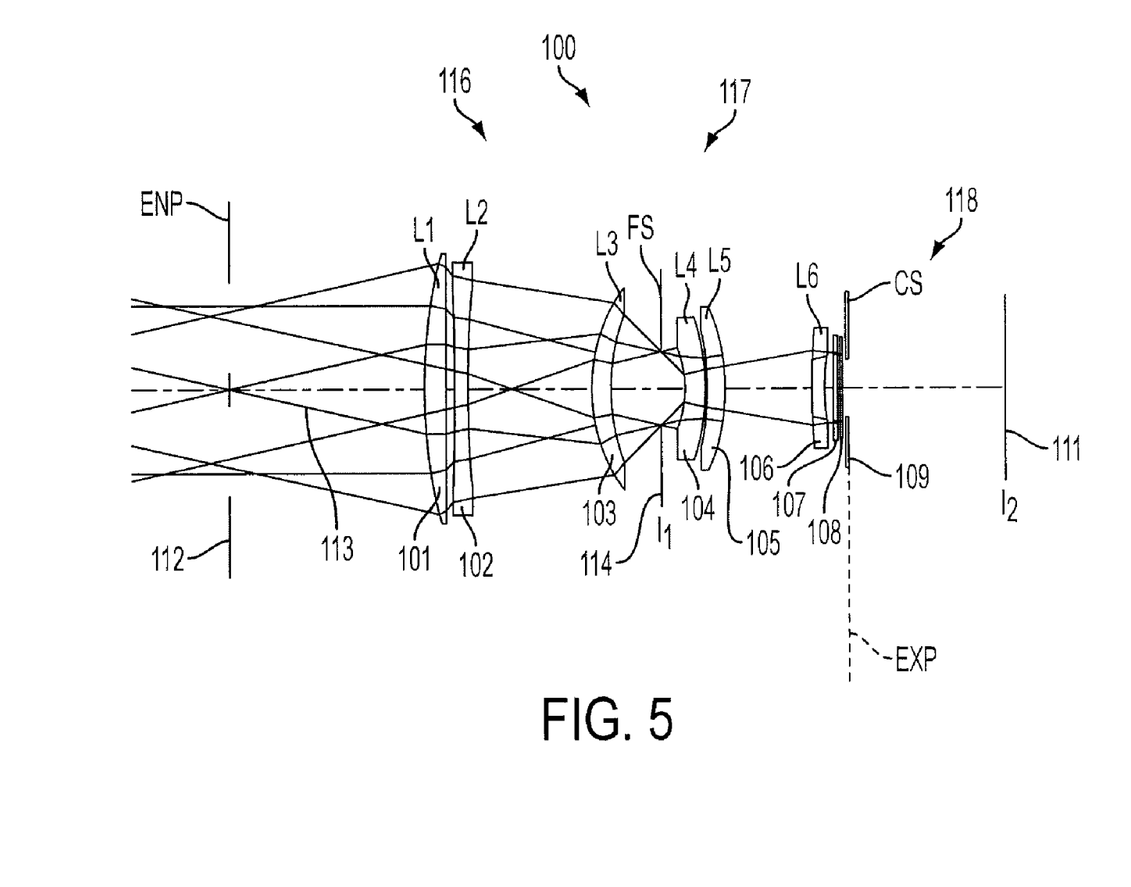
FIG. 5 is a cross sectional view of a fifth embodiment of a re-imager optical system of the invention, where the re-imager system includes six lenses.

Still another embodiment of the present invention is shown in FIG. 5 as re-imaging infrared optical system 100. As shown, re-imaging infrared system 100 includes a front objective lens group 116 for focusing light rays 113 through a real entrance pupil (ENP) 112, toward a first image ($I_1$) located adjacent, or near field stop (FS) 114. The infrared system 100 also includes a relay lens group 117 and a Dewar assembly 118. The front objective lens group 116 includes lens elements L1, L2 and L3, respectively designated as 101, 102 and 103. The relay lens group 117 includes lens elements L4, L5 and L6, respectively designated as 104, 105 and 106. The Dewar assembly 118 includes a plane parallel window, designated as 107; a spectral filter, designated as 108; a cold stop (CS), designated as 109; and a cooled detector array, which produces a final image plane ($I_2$), designated as 111.

The optical prescriptions for the lenses and elements of the re-imaging infrared optical system shown in FIG. 5 are listed in Table 5. The lens system 100 provides a nominal 95-mm focal length at 4.0 microns, an F/4 focal ratio and 15.7 degrees of field-of-view.

The re-imaging system shown in FIG. 5 provides an accessible real entrance pupil to accommodate a scanning mirror, as shown in FIG. 8, if required by application.

TABLE 5

OPTICAL PRESCRIPTIONS FOR LENS SYSTEM SHOWN IN FIG. 5
95-mm EFL, F/4, 15.7 degrees FOV

SURFACE DESCRIPTION

| S# | Radius | Shape | T or S | Material | Element Description |
|---|---|---|---|---|---|
| 0 | INF | FLT | INFINITY | | Object |
| 1 | INF | FLT | 50.000 ($d_{EN}$) | | Entrance Pupil |
| 2 | 50.120 CX | SPH | 5.0000 | SILICON | L1 |
| 3 | 672.425 CC | SPH | 1.9728 | | |
| 4 | −526.668 CC | SPH | 3.0000 | GERMANIUM | L2 |
| 5 | 92.230 CC | SPH | 29.4330 | | |
| 6 | 17.519 CX | SPH | 4.2000 | GERMANIUM | L3 |
| 7 | 16.679 CC | SPH | 9.2756 | | |
| 8 | INF | FLT | 8.1829 | | Intermediate Image($I_1$) |
| 9 | −10.905 | *A-1 | 5.0000 | GERMANIUM | L4 |
| 10 | −18.240 CX | SPH | 0.1000 | | |
| 11 | −28.762 CC | SPH | 4.5000 | SILICON | L5 |
| 12 | −17.928 CX | SPH | 20.0090 | | |
| 13 | 36.670 CX | SPH | 3.5000 | SILICON | L6 |
| 14 | 99.458 CC | SPH | 1.6912 | | |
| 15 | INF | FLT | 1.0160 | SILICON | Dewar Window |
| 16 | INF | FLT | 0.5842 | | |
| 17 | INF | FLT | 0.5080 | SILICON | Spectral Filter |
| 18 | INF | FLT | 0.0000 | | |
| 19 | INF | FLT | 38.1000 | | Aperture Stop/Cold Stop |
| 20 | INF | FLT | | | Image Plane ($I_2$) |

ASPHERIC CONSTANTS

| ASPHERIC | CURV | K | A | B | C | D |
|---|---|---|---|---|---|---|
| *A-1 | −0.09169764 | 0.000 | −7.22007E-05 | −5.74077E-07 | −9.07343E-09 | −1.57751E-10 |

Figure 6:
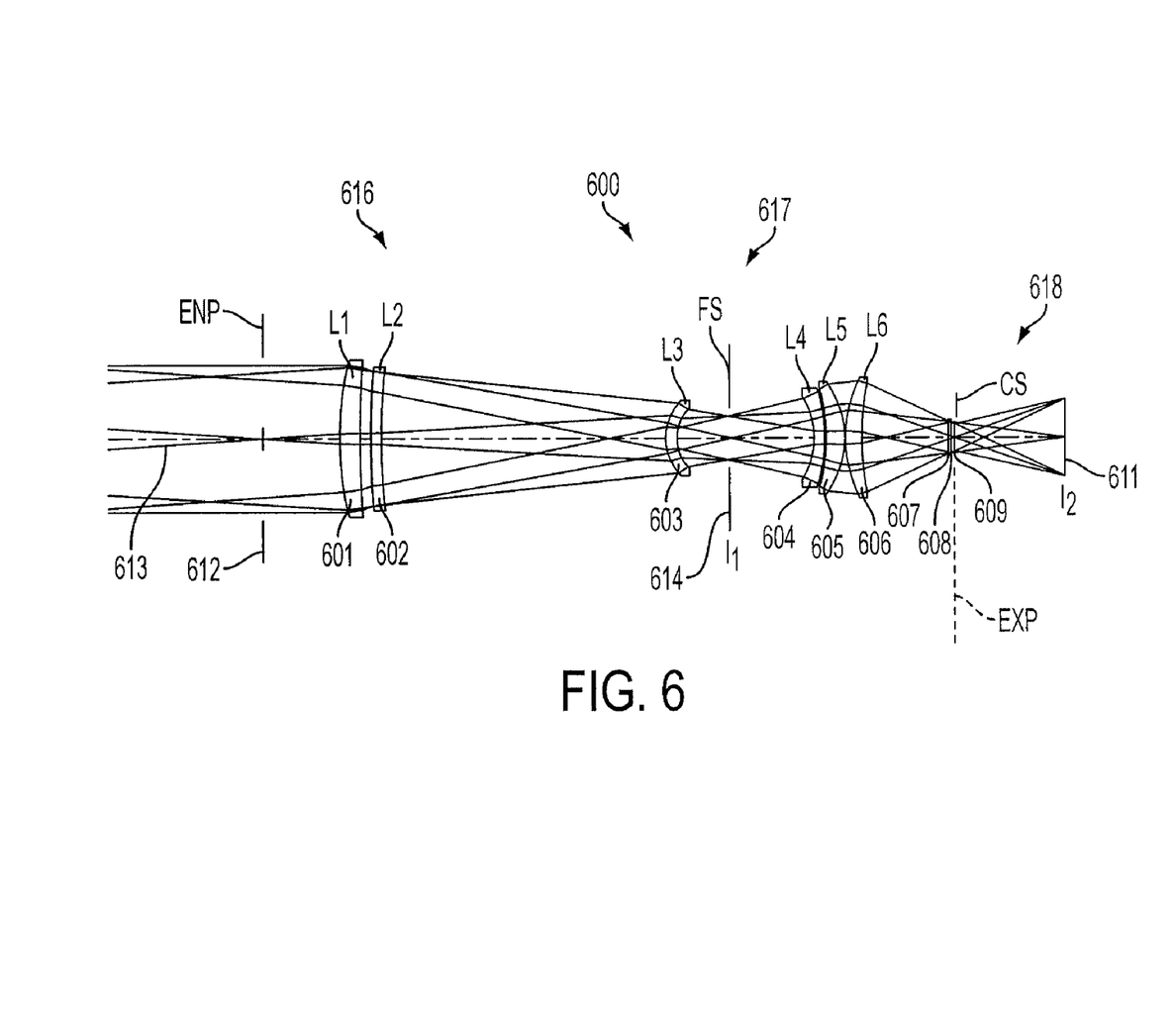
FIG. 6 is a cross sectional view of a sixth embodiment of an re-imager optical system of the invention, wherein the re-imager system includes six lenses.
Figure 7:
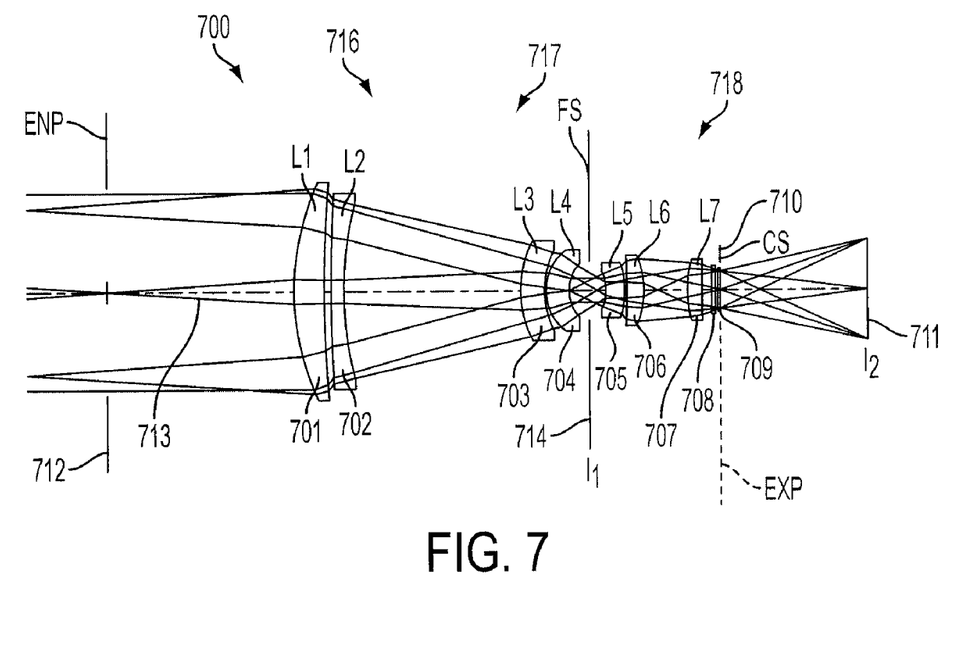
FIG. 7 is a cross sectional view of a seventh embodiment of a re-imager optical system of the invention, where the re-imager system includes seven lenses.

Two more embodiments of the present invention are shown in FIGS. 6 and 7 as re-imaging infrared optical systems 600 and 700, respectively. As shown in FIG. 6, re-imaging infrared system 600 includes a front objective lens group 616 for focusing light rays 613 through a real entrance pupil (ENP) 612, toward a first image ($I_1$) located adjacent, or near field stop (FS) 614. The infrared system 600 also includes a relay lens group 617 and a Dewar assembly 618. The front objective lens group 616 includes lens elements L1, L2 and L3, respectively designated as 601, 602 and 603. The relay lens group 617 includes lens elements L4, L5 and L6, respectively designated as 604, 605 and 606. The Dewar assembly 618 includes a plane parallel window, designated as 607; a spectral filter, designated as 608; a cold stop (CS), designated as 609; and a cooled detector array, which produces a final image plane ($I_2$), designated as 611.

The optical prescriptions for the lenses and elements of the re-imaging infrared optical system shown in FIG. 6 are listed in Table 6. The lens system 600 provides a nominal 200-mm focal length at 4.0 microns, an F/4 focal ratio and 7.5 degrees of field-of-view.

The re-imaging system shown in FIG. 6 provides an accessible real entrance pupil to accommodate a scanning mirror, as shown in FIG. 8, if required by application.

TABLE 6

OPTICAL PRESCRIPTIONS FOR LENS SYSTEM SHOWN IN FIG. 6
200-mm EFL, F/4, 7.5 degrees FOV

SURFACE DESCRIPTION

| S# | Radius | Shape | T or S | Material | Element Description |
|---|---|---|---|---|---|
| 0 | INF | FLT | INFINITY | | Object |
| 1 | INF | FLT | 50.000 ($d_{EN}$) | | Entrance Pupil |
| 2 | 107.360 CX | SPH | 7.0000 | SILICON | L1 |
| 3 | 295.673 CC | SPH | 3.8517 | | |
| 4 | 533.187 CX | SPH | 3.5000 | GERMANIUM | L2 |
| 5 | 207.032 CC | SPH | 98.2937 | | |
| 6 | 17.446 CX | SPH | 4.0000 | SILICON | L3 |
| 7 | 14.901 CC | SPH | 14.1074 | | |
| 8 | INF | FLT | 32.4373 | | Intermediate Image ($I_1$) |
| 9 | −26.377 CC | SPH | 3.5000 | GERMANIUM | L4 |
| 10 | −54.073 CX | SPH | 0.5000 | | |
| 11 | −62.858 CC | SPH | 6.3476 | SILICON | L5 |
| 12 | −32.503 CX | SPH | 0.5000 | | |
| 13 | 45.515 | *A-1 | 5.5597 | SILICON | L6 |
| 14 | 103.909 CC | SPH | 30.0166 | | |
| 15 | INF | FLT | 1.0160 | SILICON | Dewar Window |
| 16 | INF | FLT | 0.7620 | | |
| 17 | INF | FLT | 0.5080 | SILICON | Spectral Filter |
| 18 | INF | FLT | 0.0000 | | |
| 19 | INF | FLT | 38.0639 | | Aperture Stop/Cold Stop |
| 20 | INF | FLT | | | Image Plane ($I_2$) |

ASPHERIC CONSTANTS

| ASPHERIC | CURV | K | A | B | C | D |
|---|---|---|---|---|---|---|
| *A-1 | 0.02197064 | −0.934088 | 0.00E+00 | 4.97333E−11 | −6.53808E15 | 0.00E+0 |

As shown in FIG. 7, re-imaging infrared system 700 includes a front objective lens group 716 for focusing light rays 713 through a real entrance pupil (ENP) 712, toward a first image ($I_1$) located adjacent, or near field stop (FS) 714. The infrared system 700 also includes a relay lens group 717 and a Dewar assembly 718. The front objective lens group 716 includes lens elements L1, L2 and L3, respectively designated as 701, 702 and 703. The relay lens group 717 includes lens elements L4, L5 and L6, respectively designated as 704, 705 and 706. The Dewar assembly 718 includes a plane parallel window, designated as 707; a spectral filter, designated as 708; a cold stop (CS), designated as 709; and a cooled detector array, which produces a final image plane ($I_2$), designated as 711.

The optical prescriptions for the lenses and elements of the re-imaging infrared optical system shown in FIG. 7 are listed in Table 7. The lens system 700 provides a nominal 200-mm focal length at 4.0 microns, an F/4 focal ratio and 7.5 degrees of field-of-view.

The re-imaging system shown in FIG. 7 provides an accessible real entrance pupil to accommodate a scanning mirror, as shown in FIG. 8, if required by application.

TABLE 7

OPTICAL PRESCRIPTIONS FOR LENS SYSTEM SHOWN IN FIG. 7
200-mm EFL, F/4, 7.5 degrees FOV

| | SURFACE DESCRIPTION | | | | |
|---|---|---|---|---|---|
| S# | Radius | Shape | T or S | Material | Element Description |
| 0 | INF | FLT | INFINITY | | Object |
| 1 | INF | FLT | 50.000  ($d_{EN}$) | | Entrance Pupil |
| 2 | 61.603 | *A-1 | 7.8831 | SILICON | L1 |
| 3 | 257.987 CC | SPH | 2.0299 | | |
| 4 | 374.791 CX | SPH | 3.5000 | GERMANIUM | L2 |
| 5 | 91.682 CC | SPH | 45.7623 | | |
| 6 | 29.205 CX | SPH | 6.0000 | ZINC SELENIDE | L3 |
| 7 | 21.912 CC | SPH | 0.5000 | | |
| 8 | 13.286 CX | SPH | 6.0000 | GERMANIUM | L4 |
| 9 | 9.970 CC | SPH | 4.8595 | | |
| 10 | INF | FLT | 4.8476 | | Intermediate Image ($I_1$) |
| 11 | −12.026 | **A-2 | 5.0000 | GERMANIUM | L5 |
| 12 | −24.224 CX | SPH | 0.5612 | | |
| 13 | −350.754 CC | SPH | 4.6716 | SILICON | L6 |
| 14 | −20.404 | ***A-3 | 11.4930 | | |
| 15 | 28.265 | ****A-4 | 4.0238 | ZINC SELENIDE | L7 |
| 16 | −623.797 CX | SPH | 2.4819 | | |
| 17 | INF | FLT | 1.0160 | SILICON | Dewar Window |
| 18 | INF | FLT | 0.7620 | | |
| 19 | INF | FLT | 0.5080 | SILICON | Spectral Filter |
| 20 | INF | FLT | 0.0000 | | |
| 21 | INF | FLT | 38.1000 | | Aperture Stop/Cold Stop |
| 22 | INF | FLT | | | Image Plane ($I_2$) |

| ASPHERIC CONSTANTS | | | | | | |
|---|---|---|---|---|---|---|
| ASPHERIC | CURV | K | A | B | C | D |
| *A-1 | 0.01623306 | −0.027715 | 0.00E+00 | −3.50764E-12 | 0.00E+00 | 0.00E+00 |
| **A-2 | −0.08315262 | 1.097069 | 0.00E+00 | 1.00639E-06 | 1.20533E-08 | 0.00E+00 |
| ***A-3 | −0.04900982 | −1.925085 | 0.00E+00 | 4.28723E-08 | −1.28156E-10 | 0.00E+00 |
| ****A-4 | 0.03537989 | −1.804794 | 0.00E+00 | −1.76908E-07 | 6.97613E-10 | 0.00E+00 |

It will be understood that all the embodiments of the present invention, which correspond to FIGS. 1-7, utilize a common Dewar assembly package size, with a common cold stop diameter size of about 9.652 mm, a common image plane field diagonal size of about 26 mm or a detector array size covering this field size, and a common cold stop to image plane distance of about 38.1 mm. These embodiments are applicable not only to this Dewar assembly and detector sizes, but may also be scaled over wide ranges of focal lengths, apertures and field diameters, while preserving diffraction-limited performance over the 3-5 microns region of the electromagnetic spectrum.

In general, the embodiments of the present invention, which correspond to FIGS. 1-7 provide a diffraction-limited image over the 3 to 5 microns band for re-imaging optical systems that may be used with a moderately long focal length, a moderate size field-of-view, and a moderate size entrance pupil diameter.

Except for the embodiment shown in FIG. 3, the other embodiments (FIGS. 1-2 and 4-7) have an accessible entrance pupil at a distance in front of the objective lens group which enables physically adding a scanning mirror or a beam steering mirror to the optical system. All theses embodiments provide an intermediate image following the objective lens group, which enables placement of a field stop and an accessible system aperture stop (coincident with the cold stop), thereby providing a real exit pupil following the relay group.

In general, the embodiments of the present invention may be scaled, modified, and tailored to various applications that include imaging and sensors for defense, homeland security, law enforcement, airborne, intelligence, surveillance, robotics and others. In addition, the embodiments of the present invention may each be placed in a thermally invariant housing, or in an enclosure, sealed from an outside environment, in order to provide an athermalized capability. The present invention may also provide effective focal length (EFL) compensation over temperature variations, by including opto-mechanical mounting devices in the lens system that contract and expand in length to provide focus shift compensation during thermal variations.

The present invention also includes lens systems having two materials, namely silicon and germanium, as shown in prescription Tables 1, 3, 4, 5 and 6, in order to provide chromatic aberration correction. The present invention also provides lens systems having three materials, namely silicon, germanium and zinc selenide, in order to provide chromatic aberration corrections, as shown in prescription Tables 2 and 7. Where one material provides a chromatic correction in one direction, the second material provides a chromatic correction in another direction.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A lens system comprising
   a front objective lens group including at least three lenses for focusing light entering an entrance pupil and forming a first image located adjacent or near a field stop, a relay lens group including at least three lenses for focusing light from the first image toward a Dewar assembly,
the Dewar assembly including a cold stop and a cooled detector array for forming a second image, which is a magnified image of the first image, and
a distance between the entrance pupil and the detector array is less than or equal to 201 millimeters.

2. The lens system of claim 1 wherein
the at least three lenses of the front objective lens group and the at least three lenses of the relay lens group are made from either silicon or germanium.

3. The lens system of claim 1 wherein
the front objective lens group, the relay lens group and the Dewar assembly are sequentially positioned to receive the light on a common longitudinal axis.

4. The lens system of claim 1 wherein
the front objective lens group includes at least one lens located proximate to the field stop, and
the at least one lens comprising two positive radial surfaces.

5. The lens system of claim 1 wherein
the front objective lens group includes the at least three lenses comprising a total of at least four positive radial surfaces.

6. The lens system of claim 1 wherein
the relay lens group includes the at least three lenses comprising a total of at least four negative radial surfaces.

7. The lens system of claim 1 including
a scanning mirror for receiving light from an object scene and reflecting the light toward the front objective lens group.

8. The lens system of claim 1 wherein
the relay lens group includes the at least three lenses comprising at least one aspheric lens.

9. The lens system of claim 1 wherein the relay lens group includes the at least three lenses arranged as follows:
at least two of the three lenses are proximate to each other, and
at least one of the three lenses is distal from the other two of the three lenses and located proximate to the field stop.

10. The lens system of claim 1 wherein
the entrance pupil provides at least 7.5 degrees of field-of-view.

11. The lens system of claim 1 wherein
the field stop and the detector array are configured, respectively, to form the first image and the second image in the infrared spectral waveband range of 3 to 5 micrometers.

12. The re-imaging optical system of claim 1 wherein
a distance between a surface of a lens of the front objective lens group, which is positioned closest to the entrance pupil, and the detector array is less than or equal to 150 millimeters.

13. The re-imaging optical system of claim 1 wherein
a ratio between a focal length of the objective lens group and a focal length of the relay lens group is approximately equal to 5, and is effective in providing a magnification between the first image and the second image.

14. A re-imaging optical system for the mid-wave infrared range (MWIR) comprising:
a front objective lens group consisting of four first lenses disposed between an entrance pupil and a field stop, the four first lenses including at least two first lenses disposed proximate to each other and at least one first lens disposed distal from the at least two first lenses;
a relay lens group consisting of three second lenses disposed between the field stop and a Dewar assembly, the three second lenses including a total of at least four negative radial surfaces; and
the Dewar assembly including, in sequence, a window, a spectral filter, a cold stop and a cooled detector array;
wherein the front objective lens group forms a first image adjacent or near the field stop, and the Dewar assembly together with the relay lens group form a second image at the detector array,
the first and second images formed in the MWIR wave band of 3-5 microns, and
a distance between the entrance pupil and the detector array is less than or equal to 201 millimeters.

15. The re-imaging optical system of claim 14 wherein
the second image is a magnified image of the first image.

16. The re-imaging optical system of claim 14 wherein
the distance between the entrance pupil and the detector array is less than or equal to 100 millimeters.

17. The re-imaging optical system of claim 14 wherein
the four first lenses each have a concave shape.

18. The re-imaging optical system of claim 14 wherein
the first and second lenses are formed from either silicon or germanium.

19. The re-imaging optical system of claim 14 wherein
the first and second lenses are formed from a material not including chalcogenide glass.

20. The re-imaging optical system of claim 14 wherein
a distance between a surface of a first lens of the front objective lens group, which is positioned closest to the entrance pupil, and the detector array is less than or equal to 150 millimeters.

21. A re-imaging optical system comprising:
a front objective lens group consisting of four first lenses, disposed between an entrance pupil and a field stop, in the following sequence of (a) through (d):
(a) a spherical lens having two positive radial surfaces,
(b) a spherical lens having two positive radial surfaces,
(c) a spherical lens having two positive radial surfaces, and
(d) a spherical lens having two positive radial surfaces; and
a relay lens group consisting of three second lenses disposed between the field stop and a Dewar assembly, in the following sequence of (e) through (g):
(e) a lens having an aspherical negative radial surface and a spherical negative radial surface,
(f) a lens having a flat surface and a spherical negative radial surface, and
(g) a lens having a spherical negative radial surface and an aspherical negative radial surface;
wherein a first image is formed adjacent or near the field stop, and a second image is formed by the Dewar assembly and the relay lens group.

22. The re-imaging optical system of claim 21 wherein
the second image is a magnified version of the first image.

23. The re-imaging optical system of claim 22 wherein
a distance between the entrance pupil and the second image is less than or equal to 201 millimeters.

24. The re-imaging optical system of claim 23 wherein
a distance between a first surface of the spherical lens of (a) and the second image is less than or equal to 150 millimeters.

* * * * *